United States Patent [19]

Jubelt

[11] 4,358,482
[45] Nov. 9, 1982

[54] END FINISHING COMPOSITE TRIM STRIPS

[75] Inventor: Warren L. Jubelt, East Detroit, Mich.

[73] Assignee: General Motors Corporation, Detroit, Mich.

[21] Appl. No.: 314,232

[22] Filed: Oct. 23, 1981

[51] Int. Cl.³ .............................................. B05D 1/32
[52] U.S. Cl. .................................... 427/259; 427/284; 427/300
[58] Field of Search .......................... 427/259, 284, 300

[56] References Cited

U.S. PATENT DOCUMENTS 2,476,937  7/1949  White .............................. 427/259 X
3,928,661 12/1975  Higbee et al. ....................... 427/259

FOREIGN PATENT DOCUMENTS 52-17529  2/1977  Japan ................................... 427/259

Primary Examiner—Evan K. Lawrence
Attorney, Agent, or Firm—E. F. Harasek

[57] ABSTRACT

A method is provided for end finishing an elongated composite trim strip. The show surface of a strip is first coated with a mask material. The strip is then cut so that the mask material covers the show surface adjacent the cut end. The end is painted and the mask material peeled away taking with it any excess paint and providing a clean edge between the painted end and the strip's show surface.

2 Claims, 6 Drawing Figures

U.S. Patent  Nov. 9, 1982  4,358,482
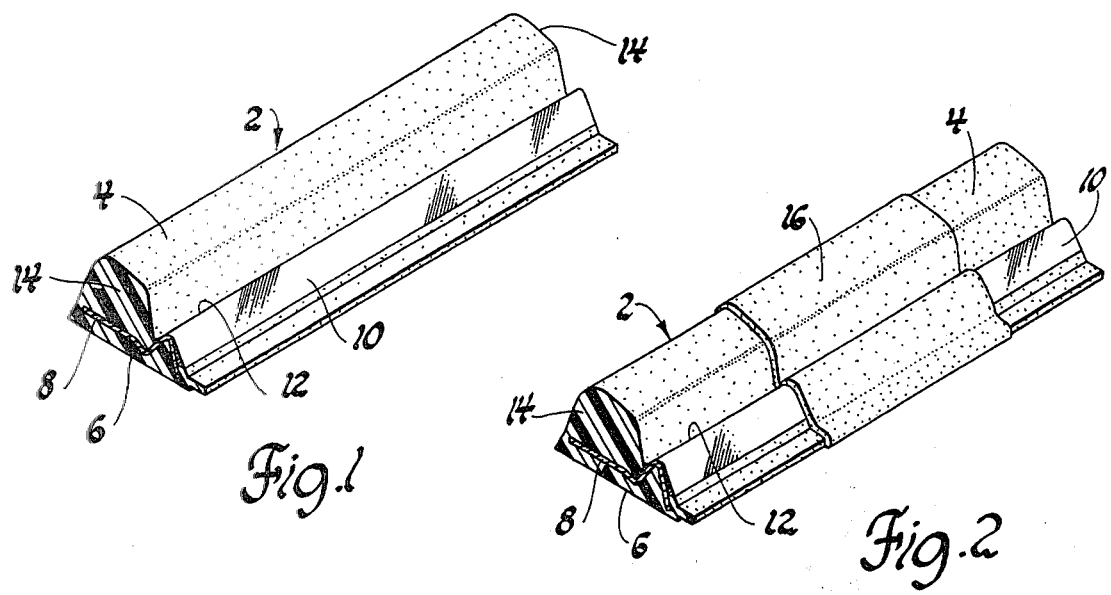
Fig.1
Fig.2
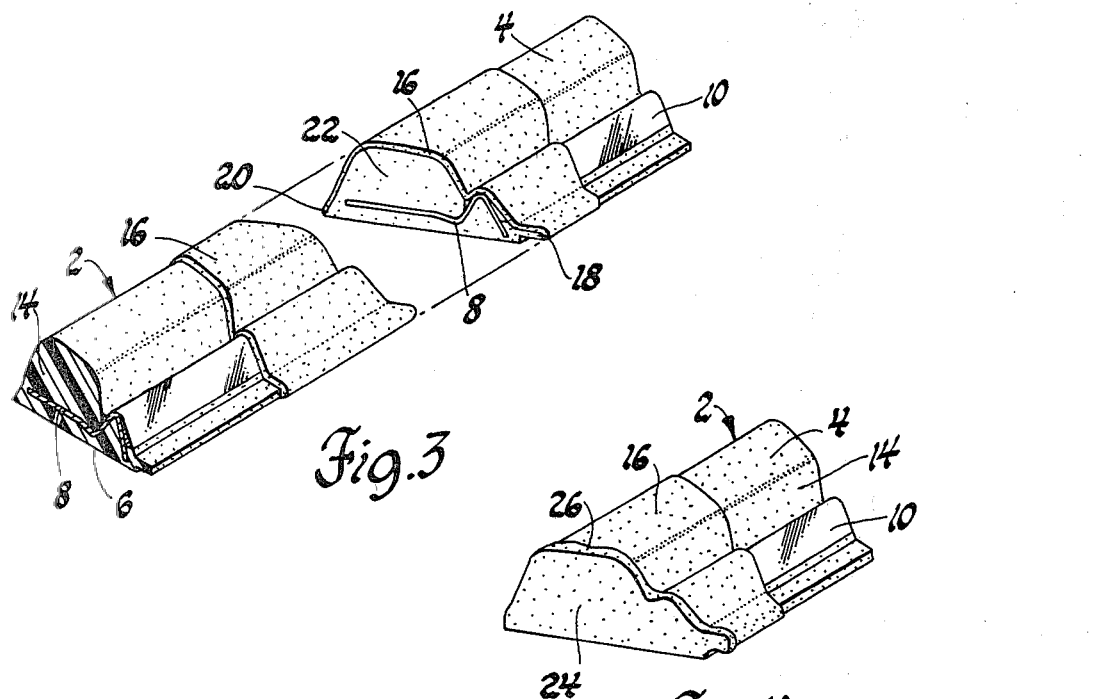
Fig.3
Fig.4
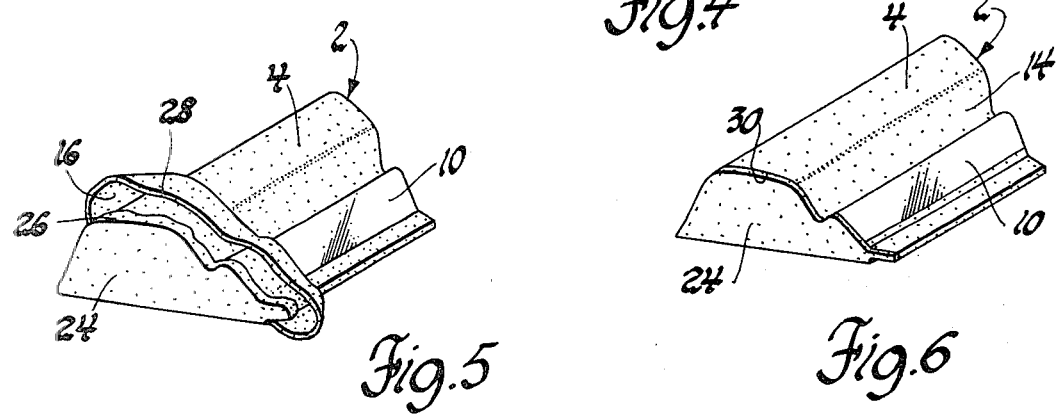
Fig.5
Fig.6

END FINISHING COMPOSITE TRIM STRIPS

This invention relates to a method of coating a cut end of an elongated extruded polymeric trim strip. More particularly, the invention relates to the use of a peelable paint mask in providing a decorative painted finish on the cut end of a thermoplastic trim strip which has a coextruded layer of decorative metal foil.

BACKGROUND

Many decorative and protective functions are served by extruded polymeric trim strips. A preferred strip design involves the coextrusion of a decorative metal foil of aluminum or other bright metal with a thermoplastic polymer such as plasticized polyvinyl chloride, chlorinated polyethylene, or ionomeric resins.

Such strips generally have a decorative contoured upper show surface and a relatively flat bottom surface adapted for mounting on a substrate. They may be used, e.g., as automotive body side moldings to protect body panels from impact damage. When the ends of a strip are cut at square or tapering angles, raw metal foil edges are exposed. It is desirable to seal these edges to prevent corrosion. They are preferably coated with an opaque paint which both seals and conceals the foil. Because such paint may be unsightly if it laps onto a decorative strip surface, paint masks have heretofore been used in the end finishing operation. The masks are cut to match the shape of the end. This method obviously entails the use of a different mask for each strip contour and cut angle. Moreover, unless the mask is kept clean and tightly secured to a strip during the paint operation, a good clean paint edge may not be achieved.

OBJECTS

Accordingly, it is an object of the invention to provide an improved method of end finishing elongated trim strips formed of a polymeric material coextruded with a metal foil.

A more particular object is to apply a peelable mask material to at least the show surface of a trim strip where it is to be cut, to make the cut, to coat the cut end and to peel the mask. By such method a cut end is provided with a finish which protects the foil edge and conceals it if desired. Use of the peelable mask prevents the end coat from adhering to the decorative surface of a strip and provides the end finish with a clean edge.

SUMMARY OF THE INVENTION

In accordance with a preferred embodiment of the invention, these and other objects are accomplished as follows.

A preferred trim strip is an automotive body side molding having a main body of plasticized vinyl coextruded with a rolled aluminum foil. The foil may lie at the surface of, or may be encapsulated in, the vinyl body. The vinyl may be colored but is preferably clear in the sections covering the foil on the decorative strip surface. The strip has a substantial thickness, generally greater than 0.25 inch, and is generally greater than 0.5 inches wide. The foil is preferably a few mils thick. The top surface of the strip has a convex contour while the bottom is substantially flat and adapted for attachment to a substrate by adhesive or mechanical means. The top surface provides a decorative effect while the body of the molding serves a protective function.

In the method, a coherent layer of peelable, polymeric mask material is applied at least over the top surface, and preferably completely around, the molding strip in the area where the end cut is to be made. Such materials are commonly referred to as "hot-melts" and are used, e.g., as protective coatings for metal tools or rust prone unfinished metal parts. The mask material is applied in a molten state by any suitable and well known method such as spraying, brushing, dipping, flow coating, etc. The mask material is allowed to cool sufficiently to maintain a clean line when cut. A cut is made completely through the strip leaving an exposed end surface. The cut may extend, for example, through the top surface of the strip to the bottom at a perpendicular or other angle with respect to the bottom. Left unprotected, the exposed edge foil at the cut end may corrode or be cosmetically unacceptable. Therefore, the end is coated with an opaque paint that will protect the foil and give the end a uniform appearance. The mask material prevents any excess paint from touching the show surface of the strip.

After the paint has dried, the mask material is peeled from the strip, taking with it any excess paint. The flexibility of the mask material allows it to be readily removed by manual or automated means. Removing the mask also leaves a well defined boundary between the paint on the finished end and the decorative vinyl trim surface.

DETAILED DESCRIPTION AND EXAMPLE

My invention will be better understood in view of the following Figures in which:

FIG. 1 is a perspective view of an extruded automotive body side molding suitable for the practice of the invention.

FIG. 2 is a view of the strip of FIG. 1 with a peelable hot melt mask applied thereto;

FIG. 3 is a view of the strip after it has been cut showing a section of exposed metal foil at the cut end;

FIG. 4 shows the cut strip end after it has been painted;

FIG. 5 shows the mask material being peeled from the strip; and

FIG. 6 shows the end finished strip after the mask material has been completely removed.

The subject invention has particular application to end finishing composite extruded polymeric molding strips. By composite strip herein is meant an elongated trim structure having a first polymeric body portion and a second portion integral therewith that is readily visibly distinguishable from the first body portion. For example, the first portion may be formed of an opaque, thermoplastic, plasticized vinyl. The second portion could be a metal foil at the surface of or embedded in the vinyl. Or, the first portion could be a clear cellulose acetate butyrate resin layer over a thin metal foil and the second portion an opaque vinyl resin. The first and second portions may also be color contrasting opaque polymers. Any such composite strip when through-cut would have an exposed end with visually contrasting first and second portions. Where one portion comprises a metal foil it is desirable to apply a corrosion resistant coating. Where the first and second portions visually contrast, it may be desirable to draw attention away from the end detail by coating the cut face with a single color.

The compositions of the contrasting first and second strip portions is not critical to the invention. The most common strips of this type, however, have a major body portion of a thermoplastic polymeric material which is coextruded with a thin bright metal foil. One such strip structure is that shown in the Figures.

The strip of FIG. 1 is a typical automotive body side molding 2 which has a contoured decorative top surface 4 having a main body portion 14 and a collateral ridge portion 12 with a relatively flat coextensive bottom surface 6 for mounting on a substrate by means of adhesive or mechanical fasteners. Such moldings generally range in size from about 0.25 to 3.0 inches in width and from about 0.25 to 2.5 inches in height although strip size is not critical.

Strip 2 was formed by coextruding thermoplastic polymeric materials and an aluminum foil 8 which was 0.005 inch thick. The main body of the strip was opaque black vinyl, however, a clear layer 10 of vinyl was extruded over the portion of foil 8 disposed in ridge 12 to present a bright metal appearance on the ridge crest. The strip was about 1 inch wide and 0.75 inch high at main body portion 14.

Automotive body side moldings are generally square cut at the door edges but may be cut at other angles as desired. The subject invention is equally suited to end finishing either type of cut. The prior art practice required different permanent mask fixtures for each different strip contour and cut angle.

Referring to FIG. 2, critical to the invention is the application of a hot melt, peelable coating 16 to at least top, decorative surface 4 of strip 2 before it is cut. Such coatings are commercially available and are used, for example, to temporarily coat tools such as drill bits to protect them from rust and impact damage before they are used. The coatings are generally peeled off the tools prior to use. They do not stick to the substrate, but form a coherent, impervious layer where applied.

A suitable coating material for this invention should exhibit certain properties. It should be a thermoplastic material with a relatively low melting temperature, preferably about 300° F. or lower, that can be coated onto a substrate in a thin layer at such temperatures. These materials are often referred to as "hot-melts." When cooled, the layer should be impervious to the end coating paint and its solvent carriers. The cooled hot melt should be solid enough at room temperature to form a clean edge when a strip is cut with a knife blade. It should be elastic enough to be readily peeled from a strip without excessive tearing. It should be removable manually or automatically by, e.g., a high pressure air jet aimed to penetrate between the mask coating and strip along the mask edge or a mechanical peeling device. It must wet well enough with the strip material to form a smooth coating on it, but should not form an adhesive bond with it. The mask material should in no way adversely affect the color, texture, or other appearance of the decorative strip nor leave any indication of its presence once stripped.

A hot melt mask composition is preferably taken from the family of thermoplastic elastomers. Such polymers include, e.g., thermoplastic polyolefins, styrene-butadiene block copolymers, thermoplastic polyurethanes, plasticized vinyls, and polyesters. Such polymers are discussed in the Modern Plastics Encyclopedia, 1980–1981 Volume at pages 124–127.

The subject peelable hot melt coatings may be applied by any suitable method. They may, for example, be brushed, sprayed, dipped or roll coated onto a strip structure.

A preferred practice of the invention will now be described in conjunction with the Figures. FIG. 2 shows the strip of FIG. 1 to which a layer 16 of hot melt peelable mask material has been applied. In the preferred practice, the mask is applied by disposing strip 2 beneath a curtain coating nozzle with a fan-shaped spray pattern. The mask material is pumped from a heated reservoir to the nozzle. The thickness of the coating is a function of the speed at which the strip moves with respect to the nozzle. It should be thick enough to avoid tearing as it is removed, generally at least about 5 mils. The mask material used was National Starch Co. compound No. 70-662 which has a low enough viscosity at 250° F. to be spray coated as described above.

Referring to FIG. 3, once the sprayed mask material has cooled and set up, the strip is through cut along a plane that is perpendicular to the plane of the strip bottom 6 which runs diagonally between longitudinal edges 18 and 20. It is critical to the invention that the mask material 16 cover the decorative strip surface 4 immediately adjacent the cut end 22 and back from it a short distance so that any excess paint applied to the end covers the mask and not the show surface of the strip.

Foil 8 clearly shows on cut end 22. FIG. 4 illustrates how this foil edge is concealed and/or protected by an applied coating 24. End finish coating 24 may, like mask material 16, be applied by any suitable method such as brushing, spraying, dipping, etc. The end finish in the embodiment shown is not only decorative, i.e., it provides a uniform opaque black surface matching the vinyl show surface 4, but it also prevents corrosion at the otherwise exposed aluminum foil edge. The end paint coating 24 is relatively thin so that any overlapping paint indicated at 26 is easily carried away with mask 16 without affecting the paint adhered to end face 22.

Referring now to FIG. 5, after end finish coating 24 has dried, peelable paint mask 16 is removed. The figure shows the mask 16 being peeled from its edge 28 remote from the painted strip end. The mask material may be manually or automatically stripped taking with it any excess overlapping end paint 26. FIG. 6 shows the strip with a finished painted end after mask material 16 has been removed. A very clean and distinct edge 30 is formed by the method between end coating 24 and decorative top surface of the strip.

In conclusion, the subject method provides a reliable method of providing a decorative end protective end finish on a composite polymeric trim member. It avoids the use of permanent mask fixtures. The method is adaptable to automation and clearly represents a substantial improvement over existing method of end finishing decorative and functional molding strips.

While my invention has been described in terms of specific embodiments thereof, clearly other forms may be readily adapted by one skilled in the art. Accordingly, the scope of my invention is to be limited only by the following claims.

The embodiments of the invention in which an exclusive property or privilege is claimed are defined as follows:

1. A method of end finishing a composite elongated molding strip comprised of a first polymeric body portion and a second body portion that is readily visibly distinguishable from said first body portion at a cut end, the method comprising:

coating the top surface of a said strip in the area to be end finished with a peelable elastomeric mask material;

cutting said strip in said coated area to reveal a cut end, the top surface adjacent said cut end being protected by said mask material;

painting the cut end to conceal the visual contrast between said first and second body portions thereat; and thereafter peeling said mask material from the strip surface, thereby removing any excess end paint and providing a well defined edge between the painted end and the top surface of the strip.

2. A method of end finishing an elongated trim strip formed of a polymeric material coextruded with a metal foil, said strip having a contoured decorative top surface, the method comprising the steps of applying a molten layer of a peelable polymeric mask material to at least the top surface of the strip portion to be end finished;

cooling said layer until it solidifies;

cutting said strip such that a desired end contour is formed and such that said mask layer covers at least the decorative surface of the strip adjacent said cut end;

applying a finish coating to the cut end; and peeling said mask material from the strip surface thereby removing any excess finish coating adherent thereto and providing a clean edge between the decorative strip surface and the coated finished end.

* * * * *